(12) United States Patent
Baikie

(10) Patent No.: US 8,836,704 B2
(45) Date of Patent: Sep. 16, 2014

(54) AUTOMATIC TREE RESTRICTION

(75) Inventor: Dawn Baikie, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 796 days.

(21) Appl. No.: 12/642,564

(22) Filed: Dec. 18, 2009

(65) Prior Publication Data

US 2011/0148878 A1 Jun. 23, 2011

(51) Int. Cl.
*G06T 11/20* (2006.01)
(52) U.S. Cl.
CPC .................................. *G06T 11/206* (2013.01)
USPC ........................................................ 345/440
(58) Field of Classification Search
None
See application file for complete search history.

(56) References Cited

U.S. PATENT DOCUMENTS

| 7,107,550 B2* | 9/2006 | Newman | 715/853 |
| 2003/0085931 A1* | 5/2003 | Card et al. | 345/853 |
| 2006/0288311 A1* | 12/2006 | Heer et al. | 715/853 |

* cited by examiner

*Primary Examiner* — Edward Martello
(74) *Attorney, Agent, or Firm* — Schwegman Lundberg & Woessner, P.A.

(57) ABSTRACT

Systems and methods to provide automatic tree restriction are provided. In example embodiments, sizing parameters for a display location are determined. Data to be graphically displayed within the sizing parameters is accessed. A determination is then performed to determine if restriction of nodes associated with the data is needed based on the sizing parameters. If needed, restriction is performed based on the determination. The restriction is performed based on predetermined criteria established prior to the determining of the sizing parameters and the accessing of the data. A graphical display of the data within the sizing parameters may then be rendered.

20 Claims, 15 Drawing Sheets

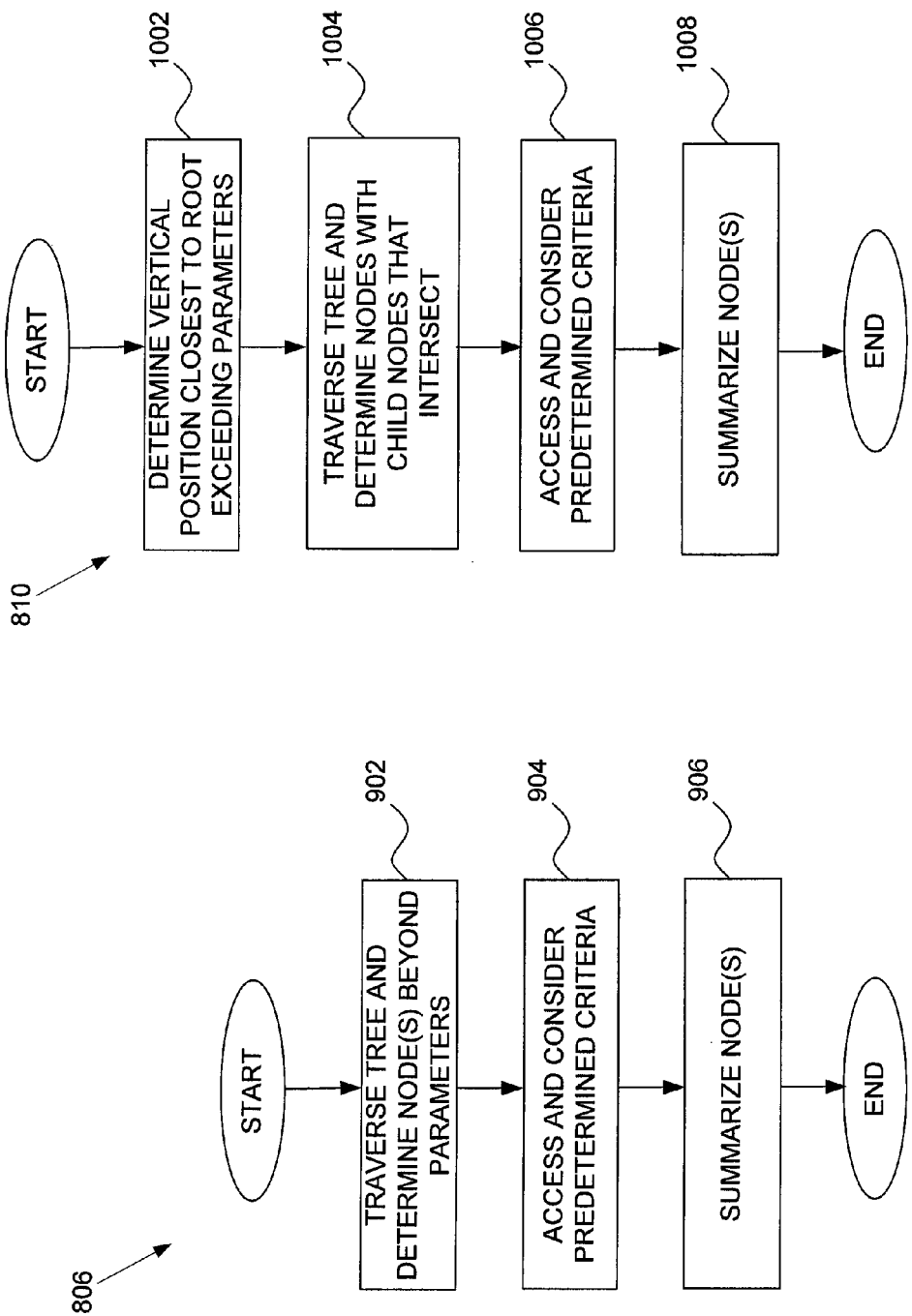

AUTOMATIC TREE RESTRICTION

FIELD

The present disclosure relates generally to graphics, and in a specific example embodiment, to providing graphics using automatic tree restriction.

BACKGROUND

Typically, organizations maintain information in a database or data warehouse regarding their structure or other information that is best displayed in a hierarchical (tree) structure. The information may be accessed and used, for example, to provide a hierarchy of the organization which illustrates a chain of command and members of teams. However, conventional systems for displaying the information in a graphical hierarchy or tree are problematic. The information may be constantly changing within the organization, and thus would not be appropriate for static display. Furthermore, many organizations are too large (e.g., have too much information) to conceivably fit within a viewable graphical display or be illustrated properly when printed.

BRIEF DESCRIPTION OF DRAWINGS

Various ones of the appended drawings merely illustrate example embodiments of the present invention and cannot be considered as limiting its scope.

FIG. 9 is a flowchart of an example method to perform vertical restriction.

FIG. 10 is a flowchart of an example method to perform horizontal restriction.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail. As used herein, the term "or" may be construed in either an inclusive or exclusive sense.

Systems and methods to provide automatic tree restriction are provided. In example embodiments, sizing parameters for a display location are determined. Data to be graphically displayed within the sizing parameters is accessed. The data is to be graphically displayed within the sizing parameters in the form of a hierarchical display or tree. In order for this to occur, a determination is made as to whether restriction of the data (or tree comprising the data) is needed based on the sizing parameters. That is, if a layout of the data is larger than the given sizing parameters, then restriction is performed on the layout. In example embodiments, the restriction is performed based on predetermined criteria established prior to the receiving of the parameters and data. These predetermined criteria may comprise, for example, user preferences that define how and when to summarize nodes of the tree such that a parent node contains summarized information regarding its non-displayed child nodes.

Example embodiments may be utilized in applications such as Crystal Reports from SAP. Crystal Reports is a business intelligence application used to generate reports from a wide range of data sources. Crystal Reports allows users to graphically design data connections and report layouts. The data sources may include Microsoft Excel spreadsheets, Oracle databases, Business Objects Enterprise business views, and local file system information. Data from these data sources (e.g., data from tables) may be placed in a report design surface graphically, such as with a chart.

Figure 1:
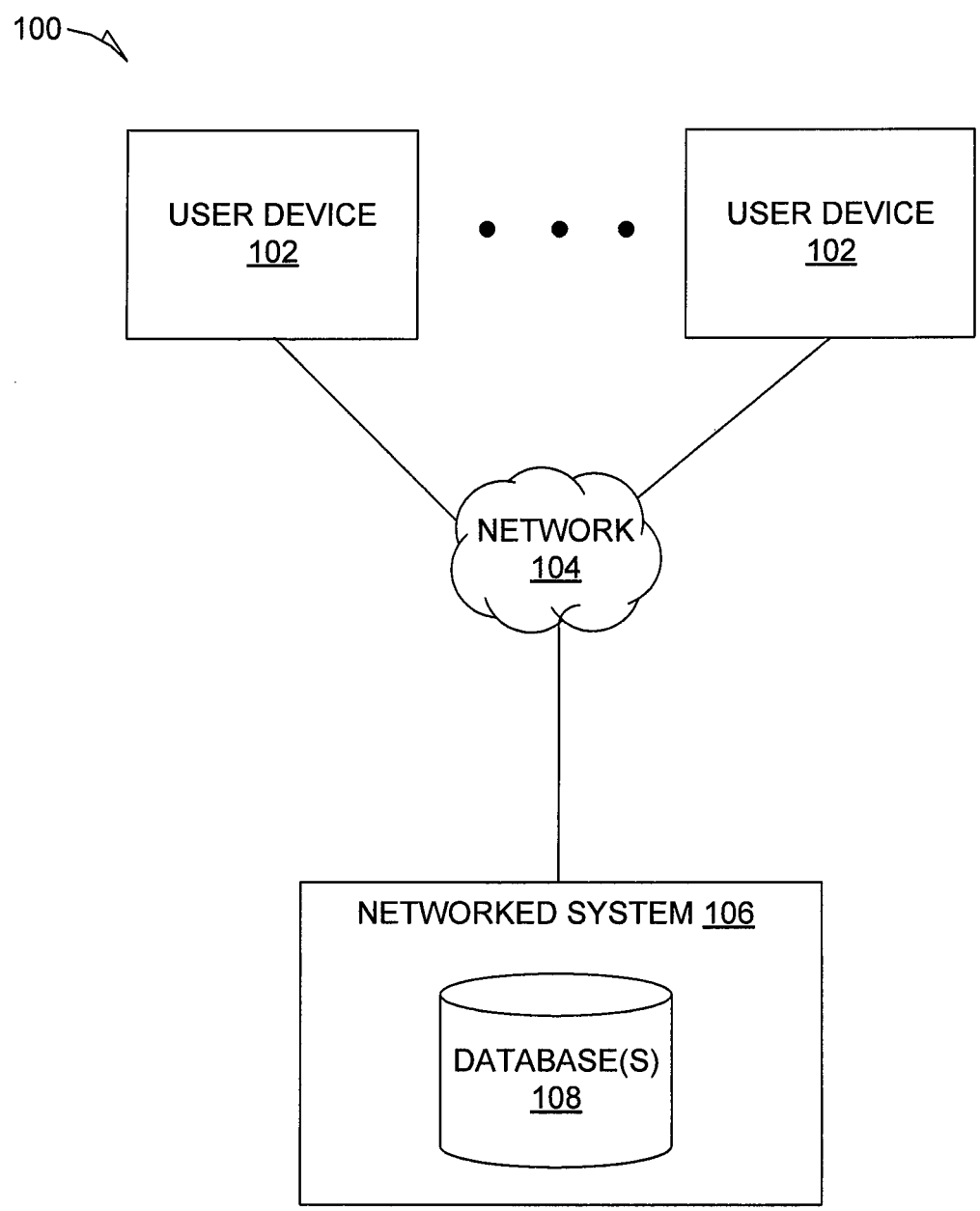
FIG. 1 is a block diagram illustrating an example of an environment in which example embodiments may be deployed.

With reference to FIG. 1, an embodiment of an environment 100 in which example embodiments of the present invention may be deployed is shown. At least one user device 102 may be communicatively coupled via a network 104 to a networked system 106. The network 104 may comprise any one or more of a local or wide area network (e.g., the Internet).

In example embodiments, the networked system 106 is associated with an organization and includes one or more databases 108 and associated storage devices. The database(s) 108 may store information such as, for example, structural data of the organization (e.g., employees and their roles) or other data which a user at the user device 102 may desire to display graphically. In some embodiments, the graphical display occurs with a larger document (e.g., within a document created using Crystal Reports). Regardless of where the information is displayed (e.g., within another document or as a stand-alone document), display limitations, such as a size of a display location, will need to be considered. Additionally, the data is dynamic, and thus may require a dynamically changeable graphical display.

While the environment 100 illustrates the user device 102 communicatively coupled to the networked system 106 in order to access data at the database(s) 108, alternative embodiments may provide a stand-alone system at the user device 102. For example, the user device 102 may comprise one or more local databases that store data, including structural data, to be graphically displayed using embodiments described herein. Thus, in these alternative embodiments, the user device 102 need not be coupled to the networked system 106. The databases (e.g., database(s) 108 or local database) may include files such as Excel files, flat files, or any other data sources that may be displayed in a graphical manner.

Figure 2:
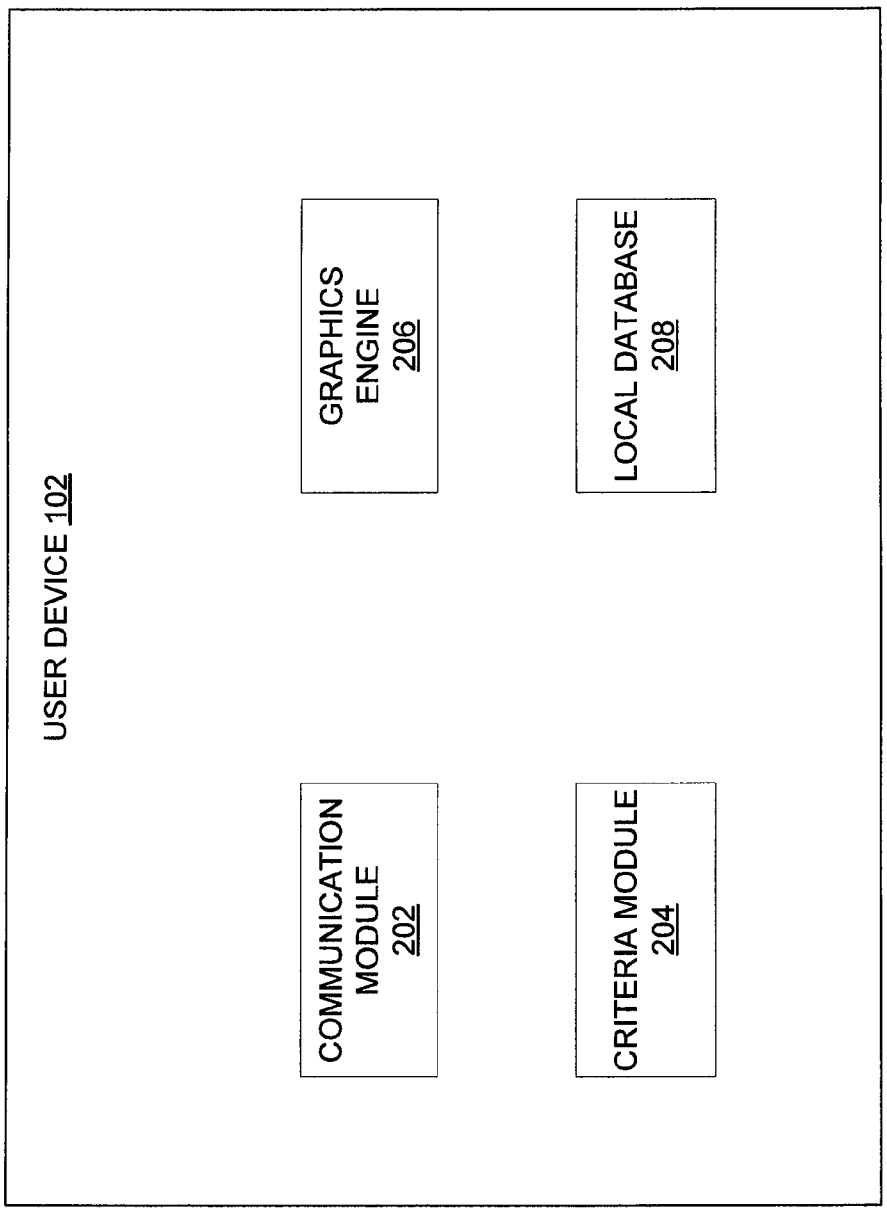
FIG. 2 is a block diagram illustrating an example embodiment of a user device.

FIG. 2 is a block diagram illustrating an example embodiment of the user device 102. The user device 102 is a processor-driven device (e.g., personal computer) which allows a user to provide instructions for the display of various information as well as to generate the display of the information. In example embodiments, the user device 102 comprises a communication module 202, a criteria module 204, a graphics engine 206, and a local database 208. The user device 102 may comprise other components (not shown) not necessary for implementation of example embodiments described herein.

The communication module 202 manages communications between the user device 102 and other components in the environment 100, as well as receives instructions from the user. For example, the communication module 202 may receive a display request from the user indicating a location where a hierarchical display or tree should be positioned.

The criteria module 204 manages predetermined criteria for the display of the tree. The predetermined criteria may comprise an indication of how to select nodes for summarization or may provide a priority for summarization. For example, the predetermined criteria may indicate that nodes with the most number of child nodes should be restricted first, or nodes that are farthest over to a side of a display window should be restricted first. These predetermined criteria may be stored to the local database 208.

In example embodiments, nodes that have the most child nodes may be summarized first so as to minimize a number of summarization iterations. As a result, a parent node (e.g., a leader) with more child nodes (e.g., larger number of team members), for example, may be chosen more often in performing summarization. As such, a user can set preferences or specify priority for summarization of nodes associated with a particular division, category, or node that should be summarized first or last. In some embodiments, a set of default criteria may be established for the user device 102. The user may then change the default criteria or provide new criteria via the criteria module 204. Because the criteria are established prior to the initial trigger for display of a particular set of data, the criteria are considered predetermined criteria.

The graphics engine 206 generates the tree for display at the indicated location having a proper size to fit within the indicated display location. The graphics engine 206 will be discussed in more detail in connection with FIG. 3.

The local database 208 stores information at the user device 102. The information includes the predetermined criteria. In a stand-alone system, the local database 208 also stores data, including structural data, to be graphically displayed using embodiments described herein. These data may include files such as Excel files, flat files, or any other data sources that may be displayed.

Figure 3:
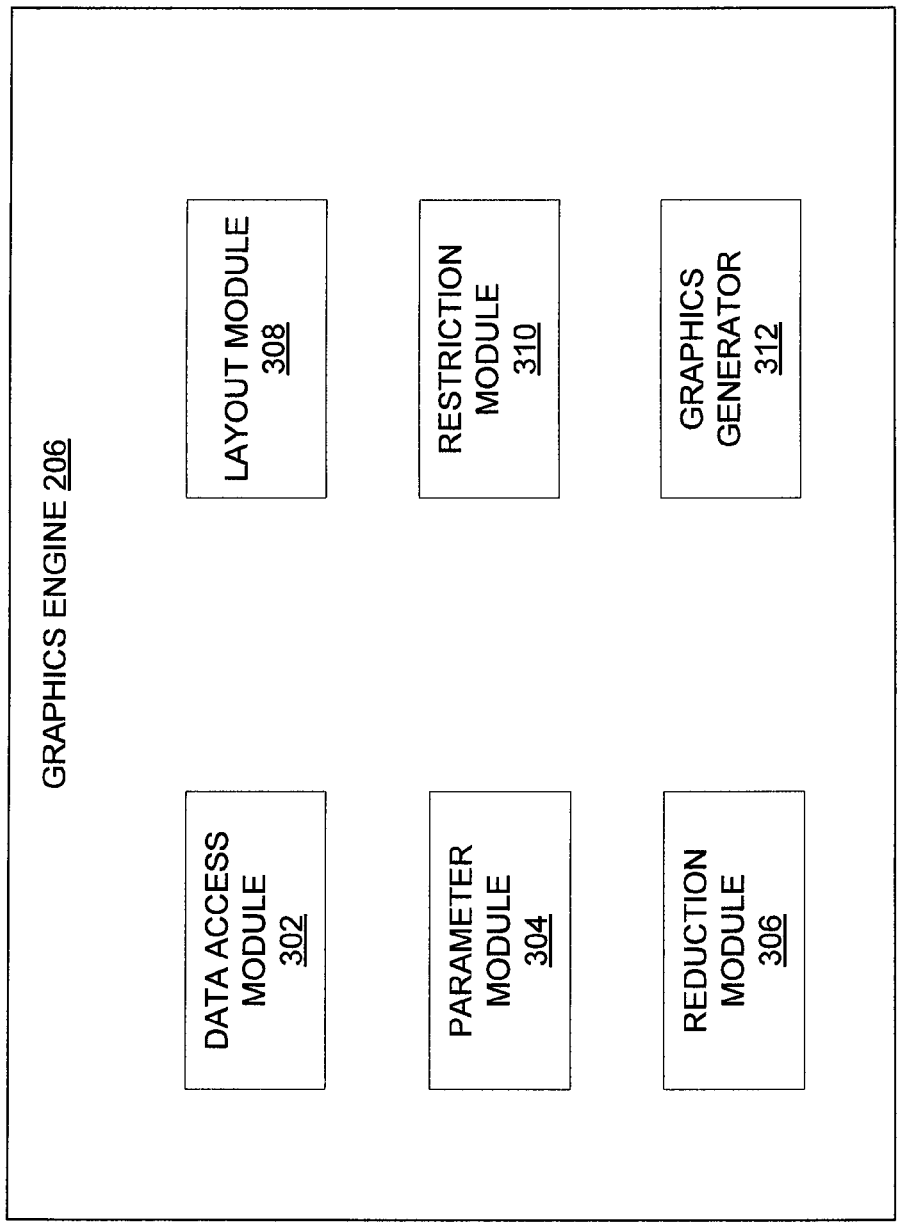
FIG. 3 is a block diagram illustrating an example embodiment of a graphics engine.

Referring now to FIG. 3, the graphics engine 206 is shown in more detail. The graphics engine 206 formats selected information for display as a tree in an indicated display location. The graphics engine 206 may comprise a data access module 302, parameter module 304, a reduction module 306, a layout module 308, a restriction module 310, and a graphics generator 312.

The data access module 302 accesses data to be graphically displayed. In example embodiments, the data may be locally stored, stored on the networked system 106, or a combination of both. In some cases, the data access module 302 works with the communication module 202 to access remotely stored data.

The parameter module 304 determines a sizing parameter associated with a display location. In some embodiments, the display request received by the communication module 202 may include sizing parameters of the display location where the tree is to be displayed. For example, a user may open a document using an application (e.g., Crystal Reports) and indicate a location where the tree should be displayed. A default area on a display or the document (e.g., a display window) may be positioned where indicated. The user may use the default display window. Alternatively, the user may resize the default display window to form a new display window. The sizing parameters (e.g., height and width) of the display window (e.g., the default display window or a resized new display window) may be determined by the parameter module 304.

The reduction module 306 may reduce a number of nodes prior to a first layout of a tree. Given a height and width defined by the sizing parameter and the maximum height and width of the nodes in a tree, a maximum number of levels of nodes that can fit within the display window (not taking layout or spacing into consideration) can be determined prior to the first layout. Subsequently, branches of the tree with more nodes lower than can possibly be displayed, or nodes with more direct child nodes than can fit horizontally, may be summarized. For example, an organization may be quite large (e.g., will result in more than 20 levels of nodes in the tree). The graphics engine 206 may determine, before the first layout of the tree that nodes located in levels beyond a top series of nodes (e.g., top 10 levels of nodes) will not fit in the display window. The reduction module 306 may summarize child nodes below the top series of nodes into a parent node within the top series of nodes before the first layout of the tree. By reducing nodes before the first layout, the number of layouts and restriction passes that need to be performed is reduced, thus optimizing the process and improving performance of the system.

The layout module 308 lays out the selected data into a tree structure. The layout module 308 utilizes a layout algorithm to format the tree structure. As the data is laid out, the layout module 308 collects certain information which may be used later by the restriction module 310, as discussed further below. The collected information includes width and height at various locations from the laid-out tree structure. Additionally, location information for each node within the tree may be generated by the layout module 308 during a first layout of the tree. In example embodiments, the layout module 308 determines if the laid-out tree fits within the display window by comparing the dimensions from the laid-out tree with the sizing parameters. If the tree does not fit, the restriction module 310 is triggered.

The restriction module 310 takes the collected information and the laid-out tree structure from the layout module 308 and restricts the tree so that the tree may fit within the display window. The restriction performed by the restriction module 310 takes into account any predetermined criteria associated with the user device 102. When restricting, child nodes are summarized into a parent node such that information associated with the summarized child nodes is shown or acknowledged through the parent node. Various examples illustrating restriction and summarization are discussed in connection with FIG. 4-FIG. 6.

In example embodiments, the restriction module 310 may restrict by performing vertical restriction or horizontal restriction. If a height of the laid-out tree exceeds a maximum height (e.g., of the sizing parameter) of the display window or location, the tree is vertically restricted. In performing vertical restrictions, the restriction module 310 traverses the tree, and each node having a bottom edge below a height of the display window (based on the sizing parameter) may be summarized into its parent node. Because a vertical location of any node is only affected by its parent nodes, the entire tree may be restricted in this manner before another tree layout is performed. Once the vertical restriction is completed on the entire tree, the tree is laid out again. The height of the tree is now less than the maximum height of the sizing parameters.

If the width of the tree exceeds a maximum width for the display window based on the sizing parameters, horizontal restriction may be performed. In one embodiment, the restriction module 310 may restrict by first searching sizing metadata associated with the laid-out tree for a vertical position of a node closest to a root node (i.e., a top node in the tree) that has a width that exceeds the maximum width of the sizing parameters. The tree may then be traversed to determine a list of nodes that have child nodes that intersect with that vertical position. One node from that list of nodes is then chosen to be summarized. The chosen node may be the node with the widest sub-tree, or the node may be chosen based on other predetermined criteria. Summarization causes the child nodes to no longer be displayed. Instead, information from the child nodes may be captured and indicated in the summarized parent node.

After summarization, another layout pass is performed. If the tree is still too large compared to the sizing parameters, a further horizontal restriction may be performed. The layout pass and horizontal restriction process may be repeated as needed until the tree fits within the sizing parameters.

While an embodiment for horizontal restriction is described based on summarizing a node associated with the widest sub-tree and closest to a root node, other nodes may be chosen based on other predetermined criteria. For example, the predetermined criteria may prioritize summarization based on a node with the narrowest sub-tree (e.g., fewest child nodes summarized) or a node with sub-trees closest (in absolute terms) to an amount of space needed to reduce the tree width by. The predetermined criteria may define any criteria to be used to choose a parent node to summarize child nodes into. Information about the node itself (e.g., number of child nodes, content of the node, etc.), along with information about each node's size, may be the basis for predetermined criteria. For example, the predetermined criteria may prioritize summarization of larger nodes (e.g., having more child nodes) first.

In an alternative embodiment, restriction may be performed during the first layout of the tree. Since the vertical location of each node is determined by a height of its parent nodes, it is possible to determine whether a node needs to be summarized without first completing a full layout pass. If the node cannot fit within the sizing parameters, the node can be summarized immediately, and the layout of any child node is prevented.

Once the tree is restricted to a size compatible with the sizing parameters, the graphics generator 312 will render the restricted tree in the designated display location.

Figure 4A:
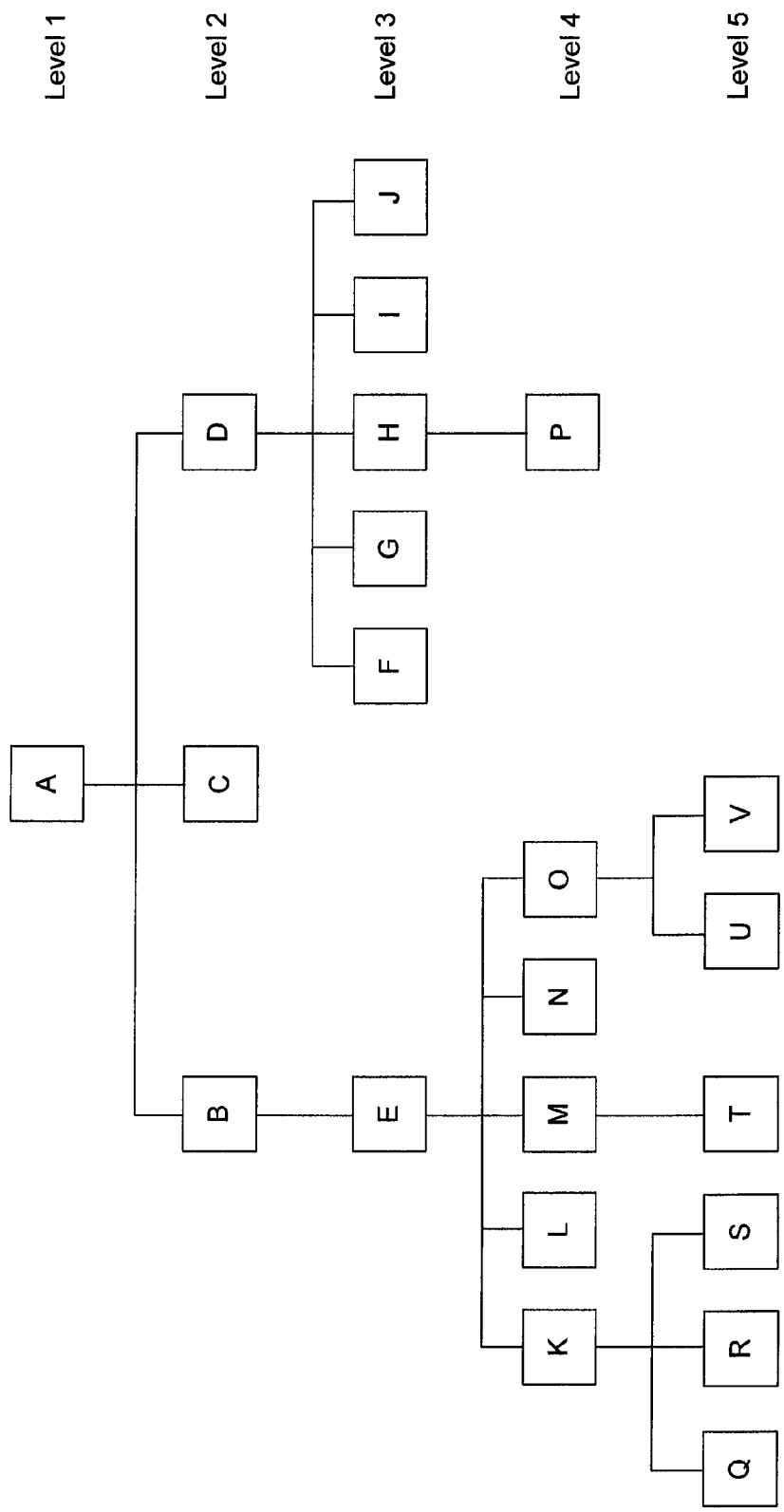
FIG. 4*a* and FIG. 4*b* illustrate a generic vertical restriction process.
Figure 4B:
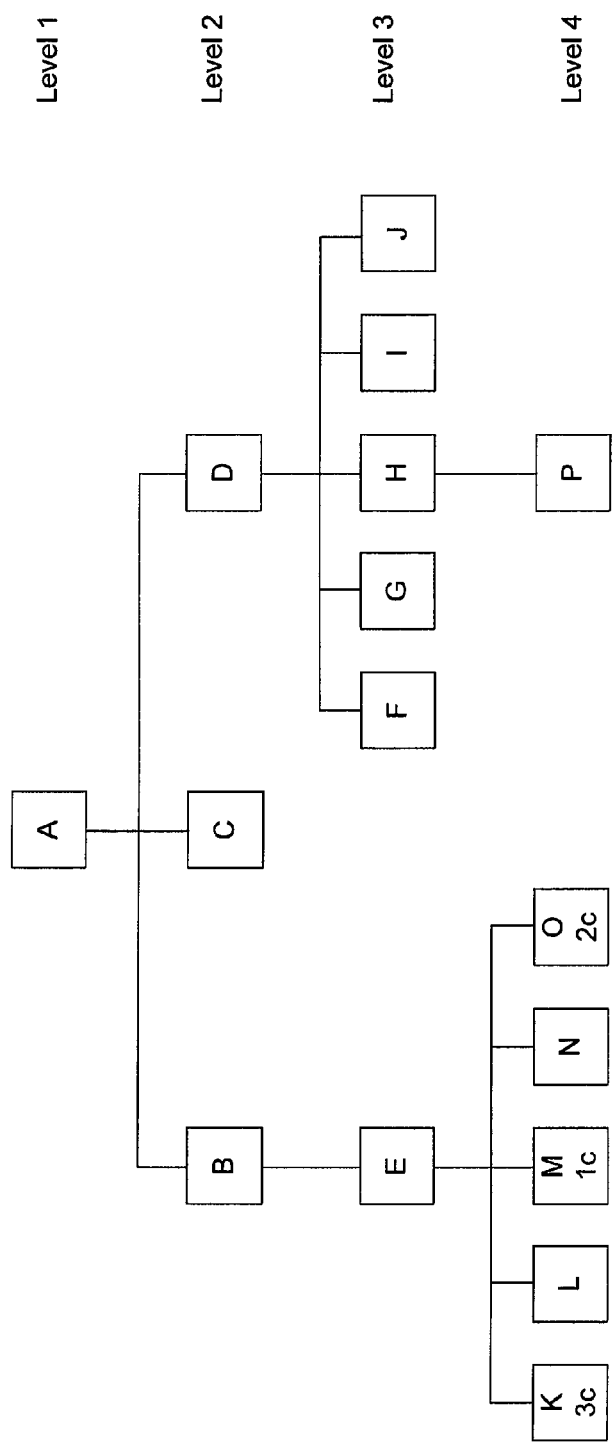

FIG. 4a and FIG. 4b illustrate a generic vertical restriction process. FIG. 4a shows an initial tree layout of data resulting in five levels of nodes. The sizing parameter may include a height that is exceeded by the laid-out tree. Thus, a vertical restriction of the laid-out tree is performed whereby, for example, based on predetermined criteria, a node level below that of the maximum height is summarized into its parent node.

Referring to FIG. 4a, the nodes in level 5 are below that of the sizing parameter. Therefore, the nodes in level 5 are summarized into their respective parent nodes in FIG. 4b. For example, nodes Q, R, and S of FIG. 4a are summarized into node K in FIG. 4b. Similarly, node T is summarized into node M, while nodes U and V are summarized into node O.

Figure 5A:
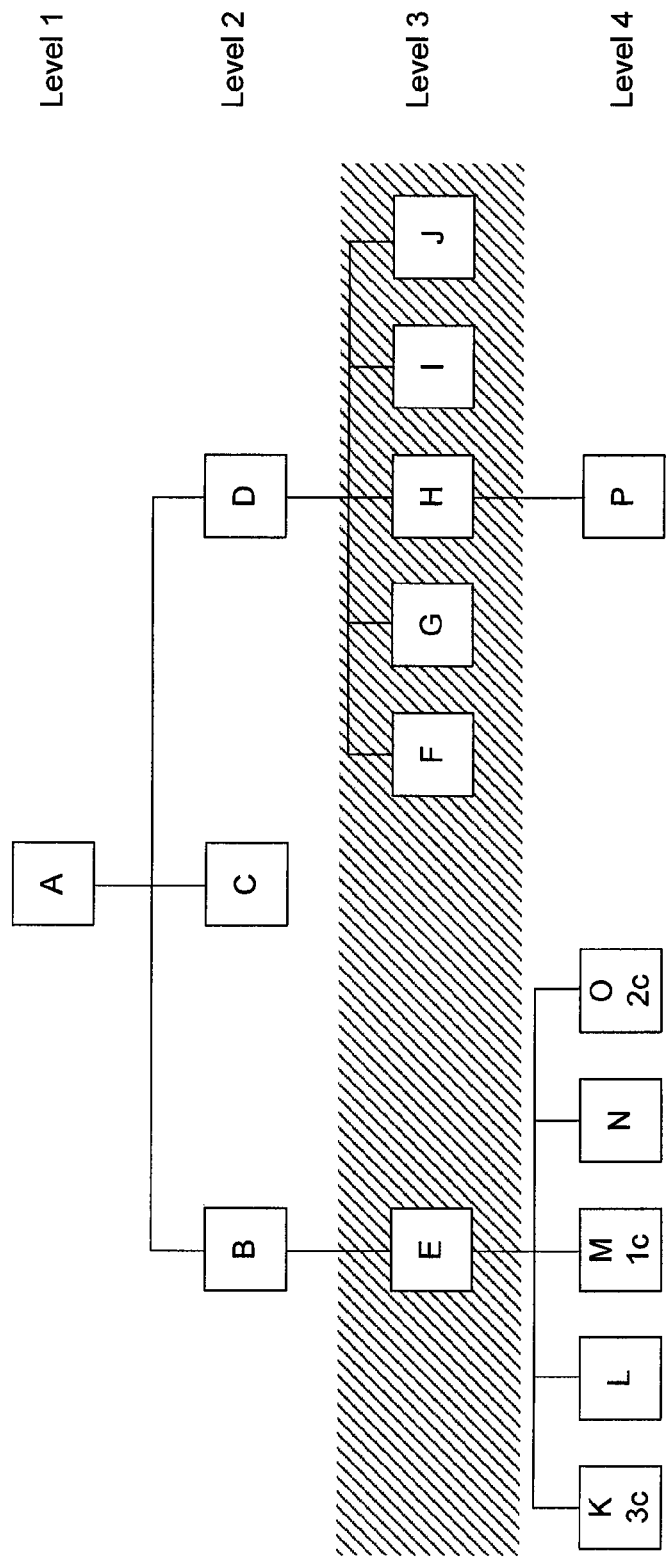
FIG. 5*a*-FIG. 5*c* illustrate a series of generic horizontal restrictions.
Figure 5B:
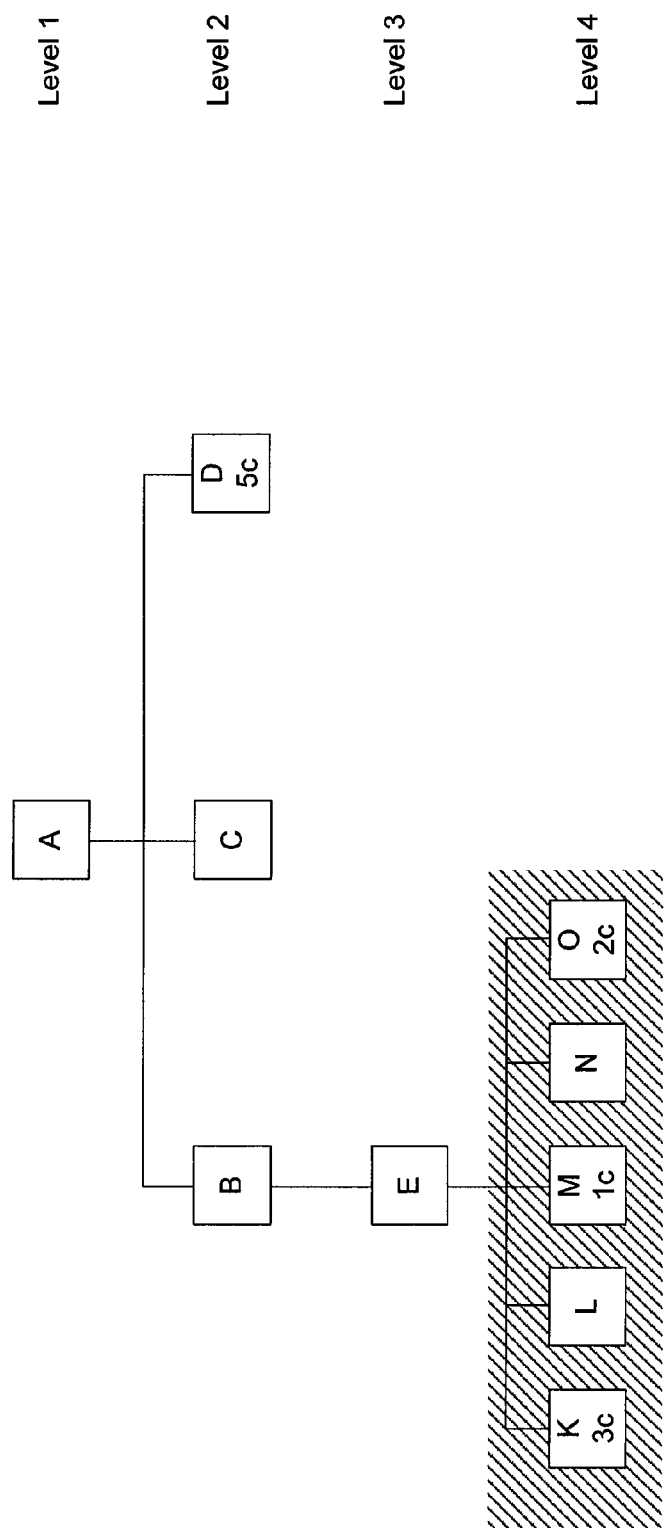
Figure 5C:
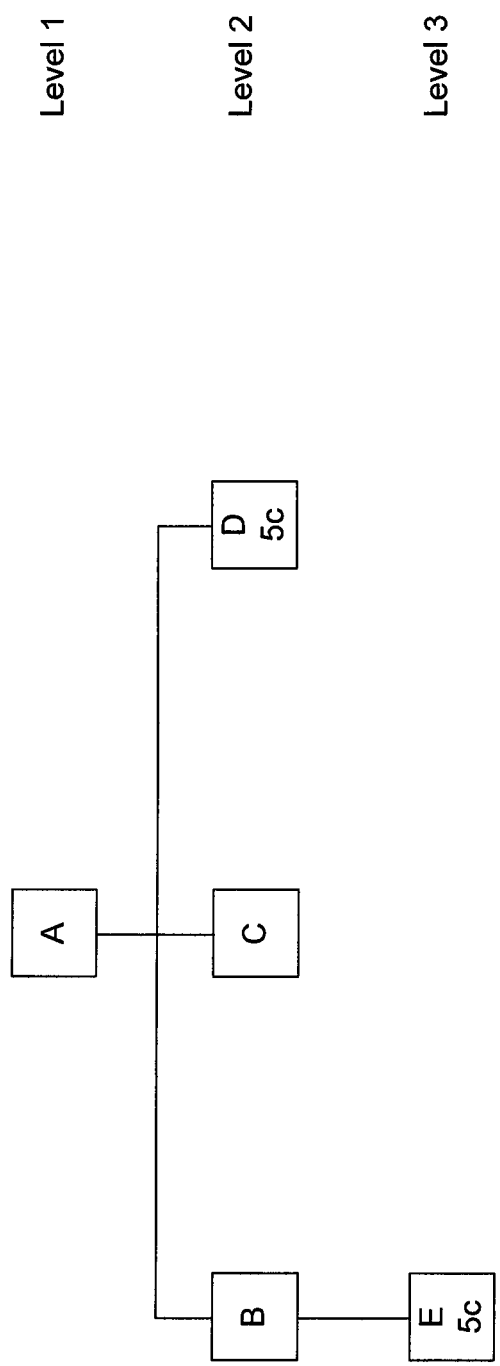

If a width of the sizing parameter is exceeded by the laid-out tree, then horizontal restriction is performed. FIG. 5a-FIG. 5c illustrate a series of generic horizontal restrictions. Continuing with the vertically restricted tree from FIG. 4b, FIG. 5a graphically indicates (i.e., shown in hash shading) that level 3 of the tree exceeds the horizontal sizing parameter. Based on predetermined criteria, for example, the nodes in level 3 that comprise the widest collection of nodes under a single parent are summarized into their parent node. In the present example, nodes F, G, H, I, and J comprise the widest collection of nodes under a single parent in level 3. Therefore, these nodes are summarized into parent node D as shown in FIG. 5b. It should be noted that an alternative predetermined criteria may cause a different summarization process to occur.

If this first horizontal restriction does not reduce the tree to within the sizing parameters, a second horizontal restriction may be performed. Referring to FIG. 5b, a graphical indication that nodes in level 4 cause the tree to exceed the sizing parameter is provided. Thus, the nodes of level 4 are summarized into the parent node E as illustrated in FIG. 5c. Consequently, the final tree comprises three levels of nodes that fit within the sizing parameters.

In some embodiments, when a user may be able to select a summarized parent node (e.g., node D), the user is directed, via their computing device, to another portion of the document in which a display window provides a sub-tree illustrating the summarized nodes with node D being the root node. Alternatively, a separate display window may "pop-up" displaying the sub-tree with node D as the root node. In yet other embodiments, selecting a summarized node causes data associated with the summarized node to be displayed.

Figure 6A:
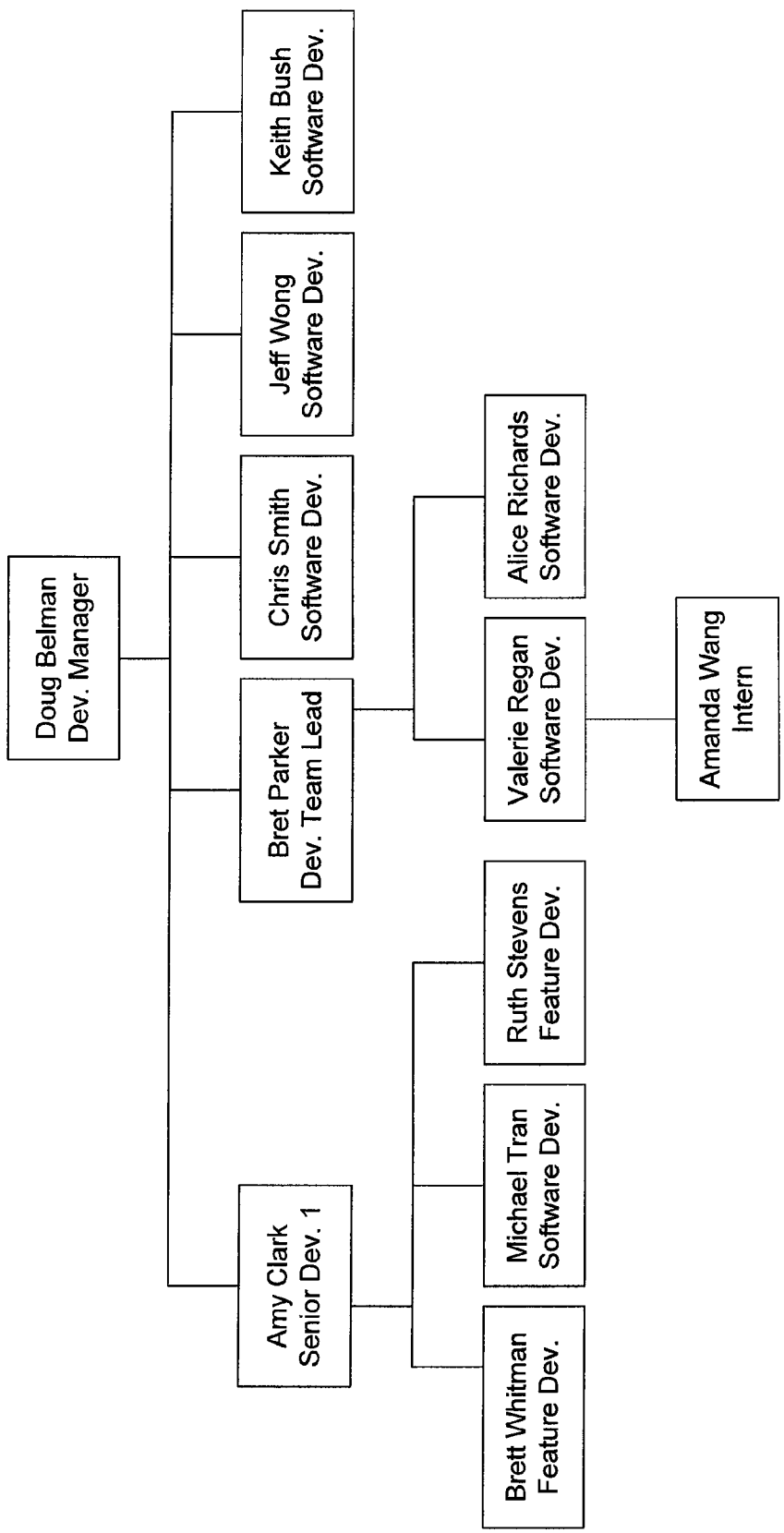
FIG. 6*a*-FIG. 6*c* is an example of a tree restriction.
Figure 6B:
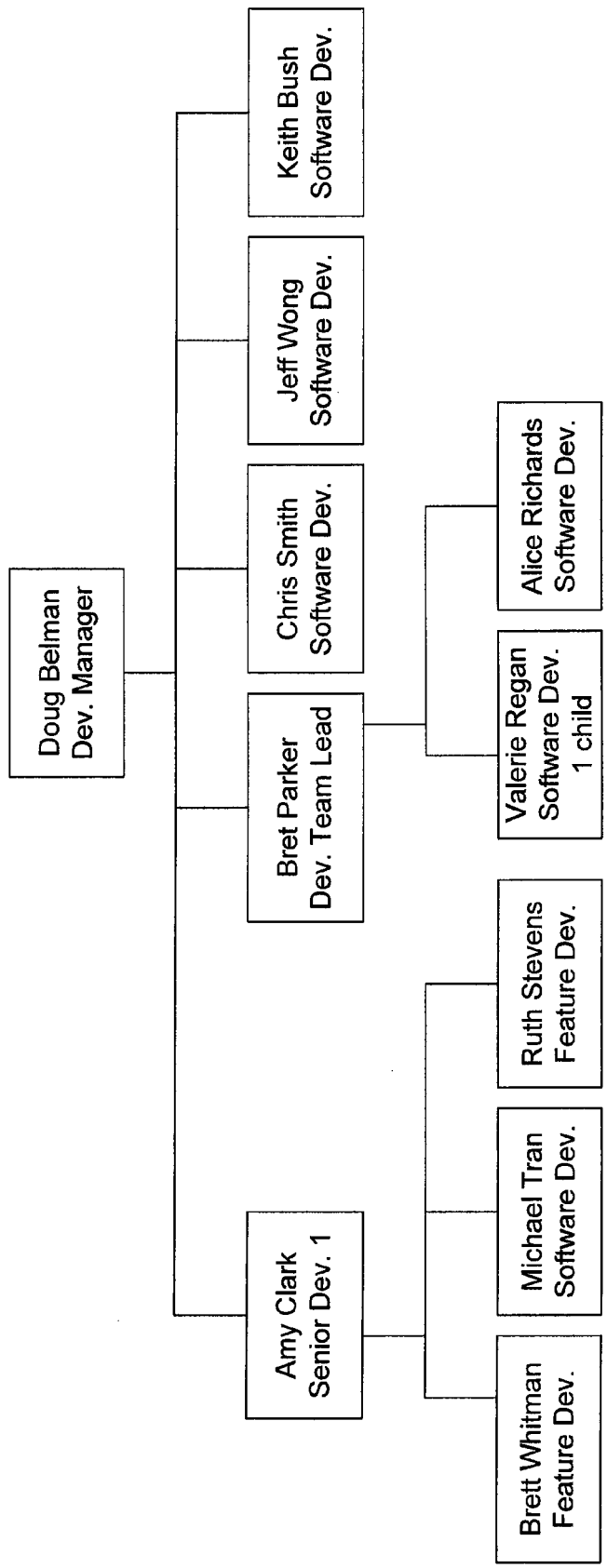
Figure 6C:
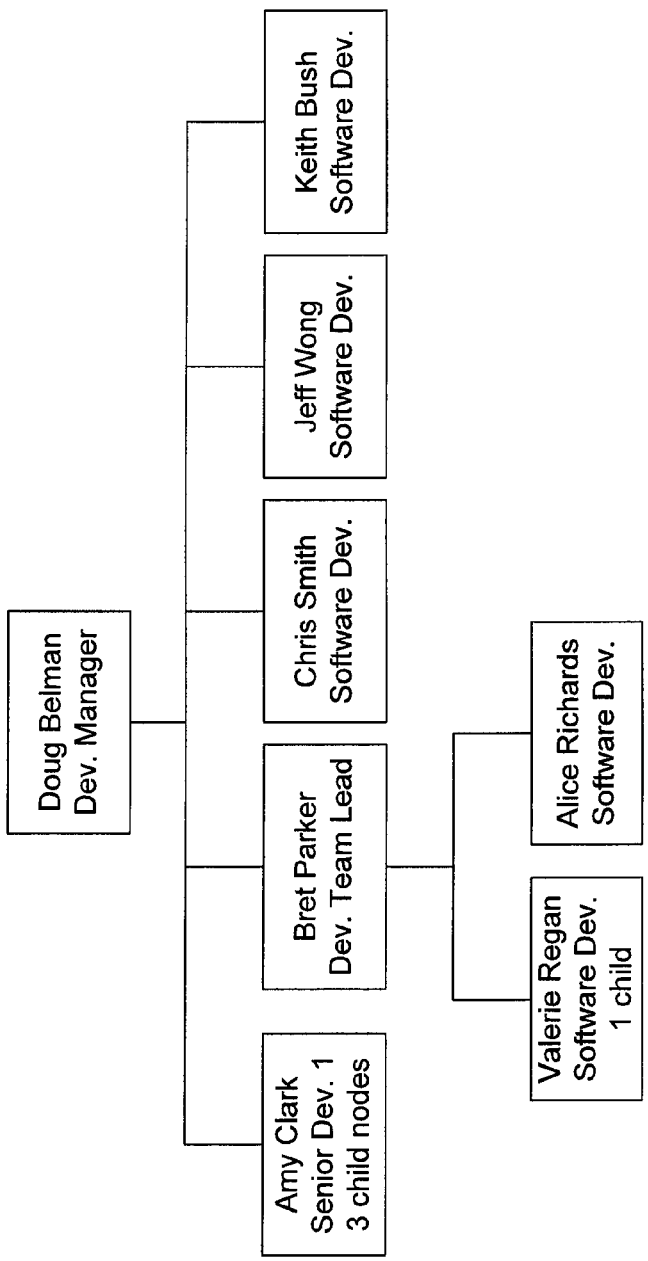

FIG. 6a-FIG. 6c illustrate an organizational chart example of a tree restriction. In an initial layout, an organizational chart is arranged into a tree structure. Sizing parameters of a location where the organizational chart is to be rendered and displayed are less than the size of the laid-out tree. In particular, a height parameter of the sizing parameter is less than the height of the tree. As such, vertical restriction is performed on the laid-out tree. In the present example, node "Amanda Wang" is below a maximum height of the sizing parameter. Therefore, node "Amanda Wang" is summarized into its parent node "Valerie Regan" and the tree is laid out again as shown in FIG. 6b.

The newly laid-out tree still exceeds the sizing parameter in width. Thus, horizontal restriction is performed. In the present example, the predetermined criteria may indicate that nodes farthest to a side are summarized. Thus, the nodes "Brett Whitman," "Michael Tran;" and "Ruth Stevens" are summarized into parent node "Amy Clark." The tree is then laid out again as shown in FIG. 6c. If the newly laid-out tree satisfies the sizing parameters, then the layout is rendered and displayed. However, if the newly laid-out tree still exceeds the sizing parameters, further restrictions may be performed.

Figure 7:
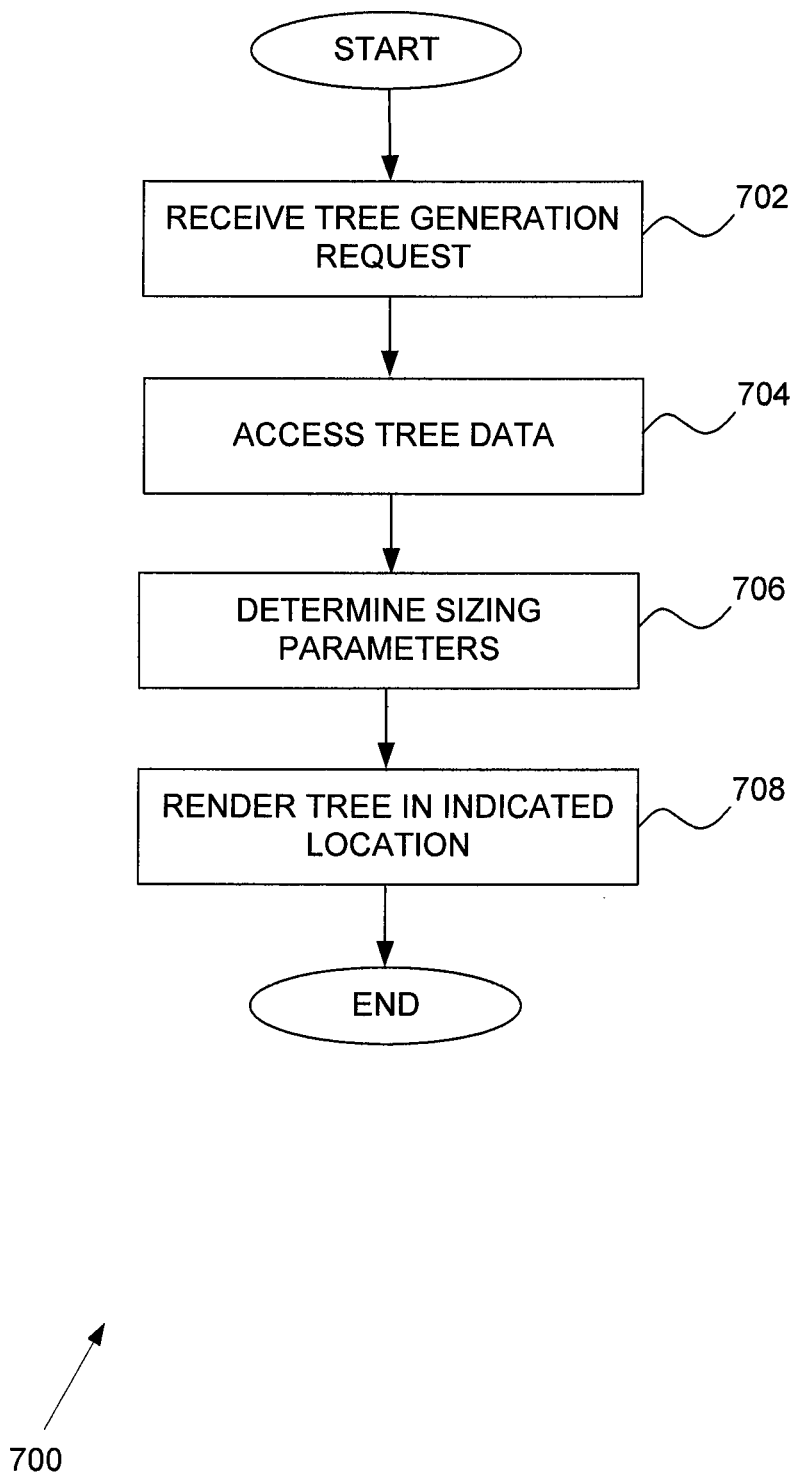
FIG. 7 is a flowchart of an example method to automatically generate a restricted tree for display.

FIG. 7 is a flowchart of an example method 700 to automatically generate a restricted tree for display. At operation 702, a tree generation request is received. In example embodiments, a user indicates a location where a tree should be displayed. The location may be within a document (e.g., via Crystal Reports) in accordance with some embodiments. The indication may cause a display window having a particular sizing parameter to be provided in the indicated location. Furthermore, the indication comprises the request that triggers the graphics engine 206 to start the layout process.

At operation 704, tree data is accessed. In example embodiments, the data access module 302 accesses the data required to generate the desired tree. The data may be stored locally (e.g., in the local database 208) or at the networked system 106 (e.g., in the database(s) 108).

Sizing parameters are determined in operation 706. In example embodiments, the parameter module 304 determines sizing parameters associated with a display location. In some instances, the tree generation request received by the communication module 202 may include sizing parameters of the display location where the tree is to be displayed.

At operation 708, a tree is rendered in the indicated location within the sizing parameters determined in operation 706. The tree rendering process (operation 708) will be discussed in more detail in connection with FIG. 8 below.

Figure 8:
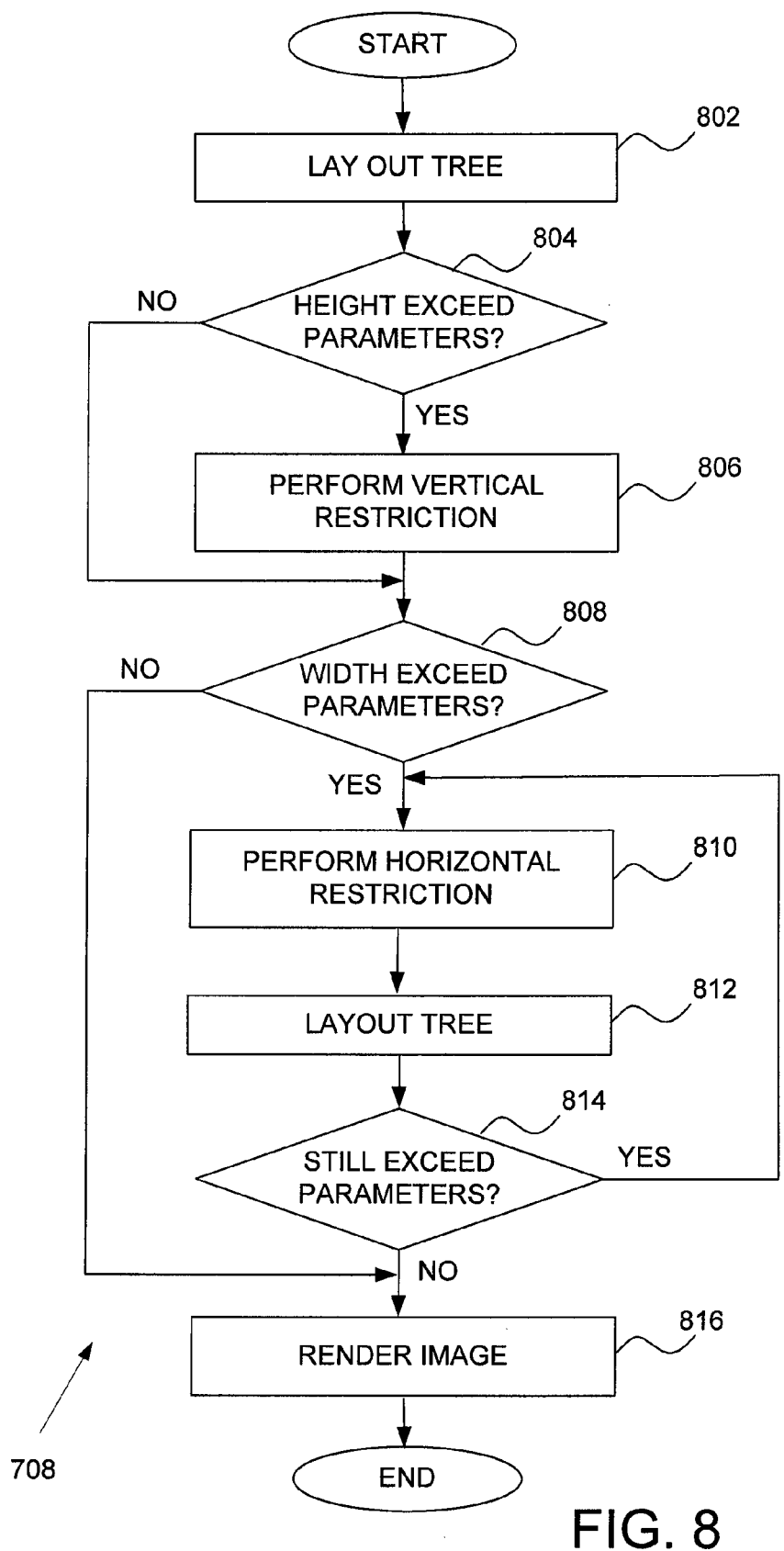
FIG. 8 is a flowchart of an example method to render a restricted tree.

FIG. 8 is a flowchart of an example method to render the restricted tree (e.g., operation 708). At operation 802, a first layout of the tree is performed. In example embodiments, the layout module 308 lays out the retrieved data into a tree structure. As the data is laid out, the layout module 308 collects certain information, including width and height at various locations, from the tree structure.

In some embodiments, prior to operation 802, the reduction module 306 may reduce a number of nodes. Given the sizing parameter determined in operation 706, a maximum number of levels of nodes that can fit within the display window (not taking layout or spacing into consideration) can be determined. Subsequently, branches of the tree with more nodes lower than can possibly be displayed, or nodes with more direct child nodes than can fit horizontally, may be summarized. By reducing the number of nodes before the first layout, the number of layouts and restriction passes that need to be performed is reduced, thus optimizing the process and improving performance of the system.

At operation 804, a determination is made as to whether the height of the laid-out tree exceeds the sizing parameters of the display location. In example embodiments, the layout module 308 performs the determination. If the height of the laid-out tree exceeds the sizing parameters, the restriction module 310 is triggered to perform vertical restriction in operation 806. An example vertical restriction process will be discussed in more detail in connection with FIG. 9 below. In some embodiments, once the vertical restriction is performed, the tree may be laid out again.

If it is determined in operation 804 that the sizing parameter height is not exceeded, or after a vertical restriction is performed, the method proceeds to operation 808, where it is determined whether the width of the sizing parameter is exceeded. If the width is exceeded, horizontal restriction is performed in operation 810. An example horizontal restriction process will be discussed in more detail in connection with FIG. 10 below. Once the horizontal restriction is performed, the tree is laid out again in operation 812.

A further determination is made in operation 814 as to whether the laid out tree still exceeds the sizing parameter in width. If the tree still exceeds the width, then the process returns to operation 810 and horizontal restriction is performed again. The process may be repeated as many times as needed to reduce the size of the laid-out tree to fit within the sizing parameters. Once the laid-out tree is within the sizing parameters, the image is rendered in the indicated locations in operation 816.

FIG. 9 is a flowchart of an example method to perform vertical restriction (e.g., operation 806). During vertical restriction, nodes are summarized into a parent node in order to reduce the height of the laid-out tree. In operation 902, the laid-out tree is traversed in order to determine nodes that lay beyond the maximum height of the sizing parameters.

At operation 904, predetermined criteria are accessed and considered in determining which nodes to summarize. In example embodiments, the predetermined criteria provide guidelines as to which nodes to summarize or an order in which to summarize nodes. For example, priorities may be established as to an order in which nodes should be summarized. Using any predetermined criteria that may be directed to vertical restriction, one or more nodes are summarized into their respective parent node in operation 906.

FIG. 10 is a flowchart of an example method to perform horizontal restriction (e.g., operation 810). During horizontal restriction, nodes are summarized into a parent node in order to reduce a width of the laid-out tree. In operation 1002, a vertical position closest to a root node with a width that exceeds the maximum width of the sizing parameter is determined. The laid-out tree is then traversed to determine any nodes with child nodes that intersect the determined vertical position at operation 1004.

At operation 1006, predetermined criteria are accessed and considered in determining which nodes to summarize. Using any predetermined criteria that may be directed to horizontal restriction, one or more nodes are chosen for summarization and summarized into their respective parent node in operation 1008.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein, as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 11:
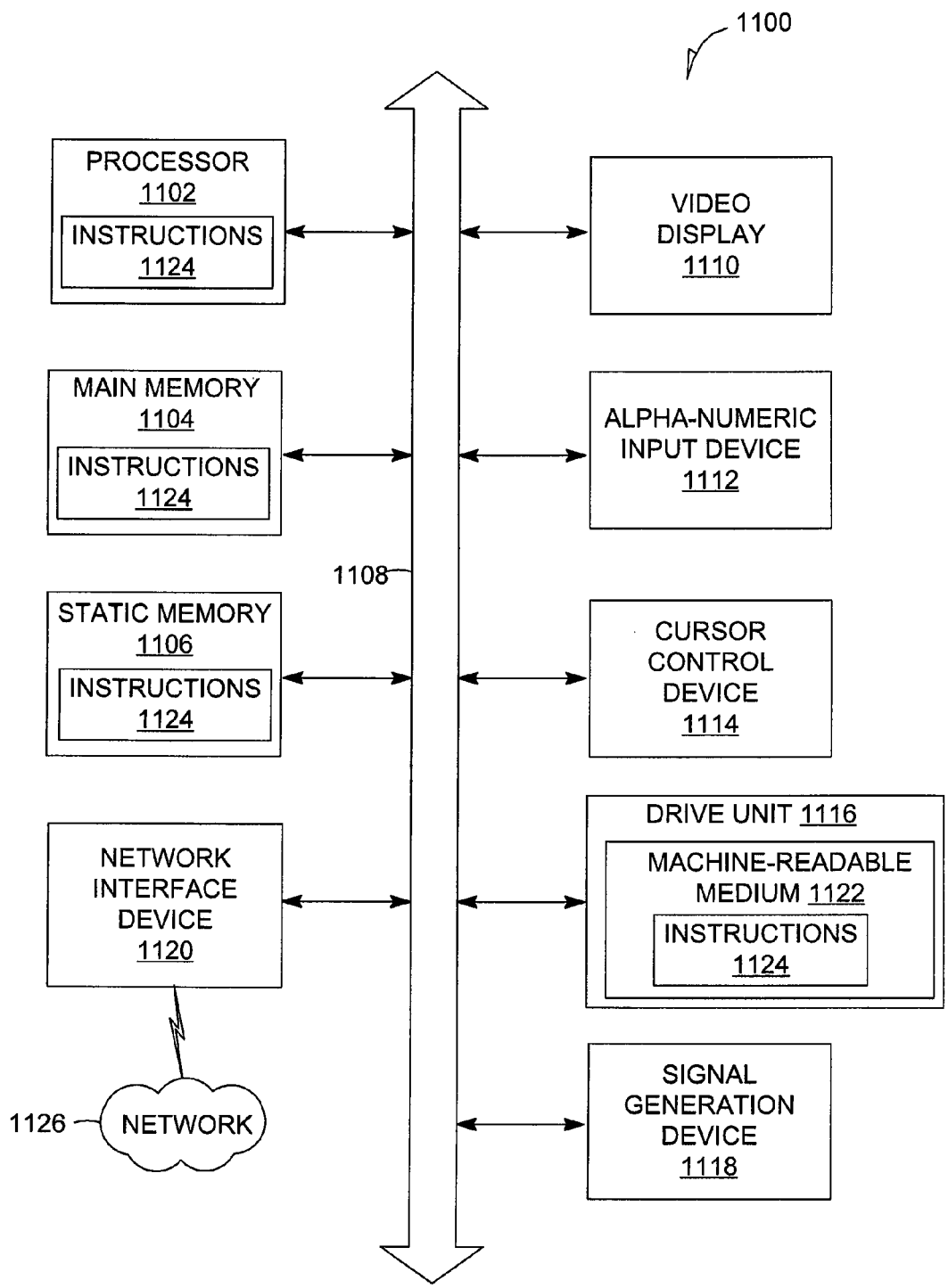
FIG. 11 is a simplified block diagram of a machine in an example form of a computing system within which a set of instructions for causing the machine to perform any one or more of the methodologies discussed herein may be executed.

With reference to FIG. 11, an exemplary embodiment extends to a machine in the example form of a computer system 1100 within which instructions for causing the machine to perform any one or more of the methodologies discussed herein may be executed. In alternative exemplary embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 may include a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). In exemplary embodiments, the computer system 1100 also includes one or more of an alpha-numeric input device 1112 (e.g., a keyboard), a user interface (UI) navigation device or cursor control device 1114 (e.g., a mouse), a disk drive unit 1116, a signal generation device 1118 (e.g., a speaker), and a network interface device 1120.

Machine-Readable Storage Medium

The disk drive unit 1116 includes a machine-readable storage medium 1122 on which is stored one or more sets of instructions 1124 and data structures (e.g., software instructions) embodying or used by any one or more of the methodologies or functions described herein. The instructions 1124 may also reside, completely or at least partially, within the main memory 1104 or within the processor 1102 during execution thereof by the computer system 1100, the main memory 1104 and the processor 1102 also constituting machine-readable media.

While the machine-readable storage medium 1122 is shown in an exemplary embodiment to be a single medium, the term "machine-readable storage medium" may include a single medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 1124 may further be transmitted or received over a communications network 1126 using a transmission medium via the network interface device 1120 and utilizing any one of a number of well-known transfer protocols (e.g., HyperText Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. For example, while the restriction process is described using a vertically laid-out tree with the root node located at a top, the restriction process may be applicable to horizontal trees (e.g., root node to one side) as well, whereby multiple vertical restrictions may occur. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   determining one or more sizing parameters of a size of a display location for displaying one or more nodes of a plurality of nodes;
   obtaining user preferences from a user, the user preferences defining criteria for summarizing one or more of the plurality of nodes, the summarizing causing a parent node to incorporate and indicate content from the one or more summarized nodes;
   accessing data to be graphically displayed within the display location;
   determining if a restriction of the plurality of nodes associated with the data is needed based on the size of the display location;
   performing restriction, using one or more processors, based on the determination, the performing of the restriction based on the user preferences and predetermined criteria established prior to the determining of the one or more sizing parameters and the accessing of the data; and
   providing a graphical display of the data in the display location.

2. The method of claim 1, wherein the determining if the restriction is needed comprises laying out the data in a tree structure comprising the nodes.

3. The method of claim 2, further comprising determining if a width or height of the tree structure exceeds a corresponding sizing parameter.

4. The method of claim 2, wherein the performing of the restriction comprises traversing the tree structure to determine the nodes of the tree structure exceeding a height of a corresponding sizing parameter.

5. The method of claim 2, wherein the performing of the restriction comprises traversing the tree structure to determine the nodes that exceed a width of a corresponding sizing parameter.

6. The method of claim 2, wherein the performing of the restriction comprises the summarizing of the one or more nodes into the parent node in order to reduce a dimension of the tree structure.

7. The method of claim 1, further comprising
   laying out a tree structure after the performing of the restriction;
   determining if further restriction of the nodes is needed based on one or more of the sizing parameters; and
   performing the further restriction based on the determination that further restriction is needed.

8. The method of claim 1, wherein the determining if the restriction is needed and the performing of the restriction occurs during a first layout of the data in a tree structure.

9. The method of claim 1, further comprising reducing a number of the nodes prior to a first layout of a tree.

10. A system comprising:
    a parameter module to determine one or more sizing parameters of a size of a display location for displaying one or more nodes of a plurality of nodes;
    a communication module for obtaining user preferences from a user, the user preferences defining criteria for summarizing one or more of the plurality of nodes, the summarizing causing a parent node to incorporate and indicate content from the one or more summarized nodes;
    a data access module to access data to be graphically displayed within the display location;
    a layout module to determine if a restriction of the plurality of nodes associated with the data is needed based on the size of the display location;
    a restriction module to perform restriction, using one or more processors, based on the determination by the layout module, the performing of the restriction based on the user preferences and predetermined criteria established prior to the determining of the one or more sizing parameters and the accessing of the data; and
    a graphics generator to provide a graphical display of the data in the display location.

11. The system of claim 10, wherein the layout module is further configured to lay out the data in a tree structure comprising the nodes.

12. The system of claim 10, further comprising a criteria module to establish the predetermined criteria prior to the determining of the one or more sizing parameters and the accessing of the data.

13. The system of claim 10, further comprising a reduction module to reduce a number of the nodes prior to a first layout of a tree.

14. A machine-readable storage medium in communication with at least one processor, the machine-readable storage medium storing instructions which, when executed by the at least one processor, provides a method comprising:
    determining one or more sizing parameters of a size of a display location for displaying one or more nodes of a plurality of nodes;
    obtaining user preferences from a user, the user preferences defining criteria for summarizing one or more of the plurality of nodes, the summarizing causing a parent node to incorporate and indicate content from the one or more summarized nodes;
    accessing data to be graphically displayed within the display location;
    determining if a restriction of the plurality of nodes associated with the data is needed based on the size of the display location;
    performing restriction based on the determination, the performing of the restriction based on the user preferences and predetermined criteria established prior to the determining of the one or more sizing parameters and the accessing of the data; and
    providing a graphical display of the data in the display location.

15. The machine-readable storage medium of claim 14, wherein the determining if the restriction is needed comprises laying out the data in a tree structure comprising the nodes.

16. The machine-readable storage medium of claim 15, wherein the method further comprises determining if a width or height of the tree structure exceeds a corresponding sizing parameters.

17. The machine-readable storage medium of claim 15, wherein the performing the restriction comprises the summarizing of the one or more nodes into the parent node in order to reduce a dimension of the tree structure.

18. The machine-readable storage medium of claim 14, wherein the method further comprises:
   laying out a tree structure after the performing of the restriction;
   determining if further restriction of nodes is needed based on the one or more sizing parameters; and
   performing the further restriction based on the determination that further restriction is needed.

19. The machine-readable storage medium of claim 14, wherein the determining if the restriction is needed and the performing of the restriction occurs during a first layout of the data in a tree structure.

20. The machine-readable storage medium of claim 14, wherein the method further comprises reducing a number of the nodes prior to a first layout of a tree.

* * * * *